United States Patent [19]

King, Jr.

[11] 3,835,525
[45] Sept. 17, 1974

[54] METHOD OF FABRICATING A JOINT
[76] Inventor: John O. King, Jr., 3990 N. Ivy Rd., Atlanta, Ga. 30342
[22] Filed: July 3, 1972
[21] Appl. No.: 268,477

Related U.S. Application Data
[63] Continuation-in-part of Ser. Nos. 33,281, April 30, 1970, , and Ser. No. 882,126, Dec. 4, 1969, , which is a continuation-in-part of Ser. No. 711,368, March 7, 1968, abandoned.

[52] U.S. Cl............................ 29/412, 29/428, 29/526
[51] Int. Cl............................................. B23p 17/00
[58] Field of Search ............. 29/412, 428, 458, 526, 29/525, 520; 287/189.36 F

[56]         References Cited
            UNITED STATES PATENTS

| | | | |
|---|---|---|---|
| 1,440,576 | 1/1923 | Astrom | 287/189.36 F |
| 1,670,532 | 5/1928 | Crawford | 29/520 |
| 2,296,470 | 9/1942 | Keehn | 287/189.36 F |
| 3,029,912 | 4/1962 | Barker | 287/189.36 F |
| 3,173,522 | 3/1965 | Zimmer et al. | 287/189.36 F |
| 3,270,410 | 9/1966 | Salter et al. | 287/189.36 F |
| 3,271,058 | 9/1966 | Anderson | 287/189.36 F |
| 3,298,725 | 1/1967 | Boteler | 287/189.36 F |
| 3,356,404 | 12/1967 | Peters | 287/189.36 F |
| 3,541,917 | 11/1970 | Van Douwen | 287/189.36 F |
| 3,725,995 | 4/1973 | Sharp et al. | 29/458 |

Primary Examiner—Charles W. Lanham
Assistant Examiner—James R. Duzan
Attorney, Agent, or Firm—B. J. Powell

[57]         ABSTRACT
Method for forming a fastener joint in which the effective diameter of high strength fasteners utilized particularly in aerospace and marine standards is precisely enlarged, for preventing corrosive chemical reactions between the work pieces and the fastener, and for preventing fretting between composite materials and the fasteners. The method includes the steps of encircling the shank of the fastener with a metal member of a predetermined thickness so that the member is in close tolerance bearing contact with the shank of the fastener and will be in bearing contact with the aligned holes through the work pieces when the fastener is in position; and seating the member encircling the shank of the fastener by tightening the fastener against the work pieces. The metal member may be a material that is not chemically reactive with the work pieces to be fastened together to prevent the fastener from chemically reacting with the work pieces.

When the sleeve member of the invention is installed, its outside surface or the inside surface of the holes may be coated with an adhesive sealant before it is inserted into the holes so that the sleeve member is bonded to the holes and the fastener can be installed and removed without removing the sleeve member. When it is desirable that the work pieces of a joint be capable of separation, the sleeve member of the invention can be first severed to a length corresponding to the combined thickness of all of the work pieces of the joint and then the thusly severed sleeve member subdivided into segments corresponding to the individual thickness of each of the work pieces of the joint. When the subdivided sleeve member is installed in the corresponding work pieces, the joint may be subsequently separated even if the sleeve member is bonded to the work piece.

9 Claims, 12 Drawing Figures

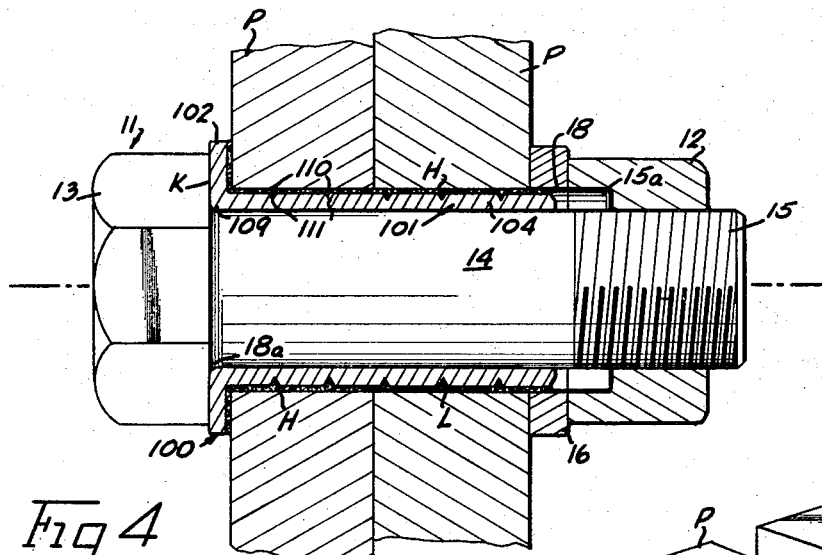
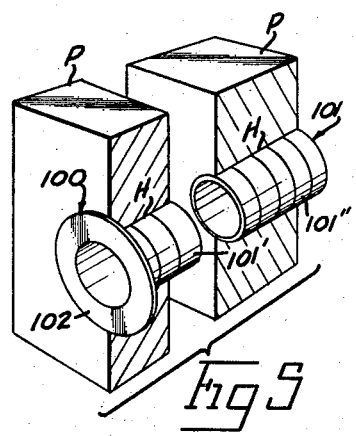
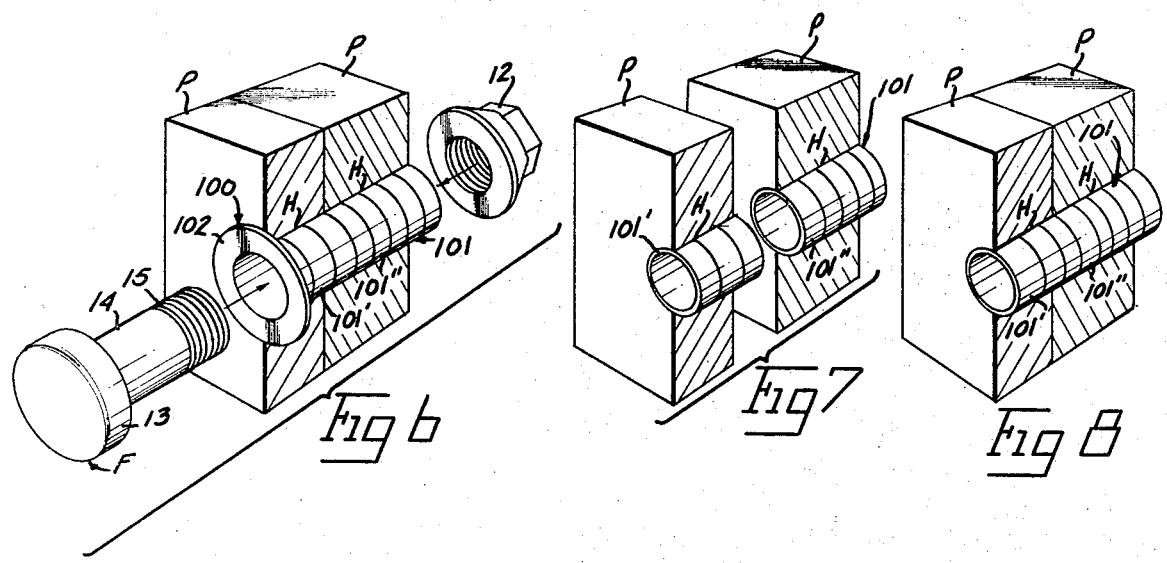

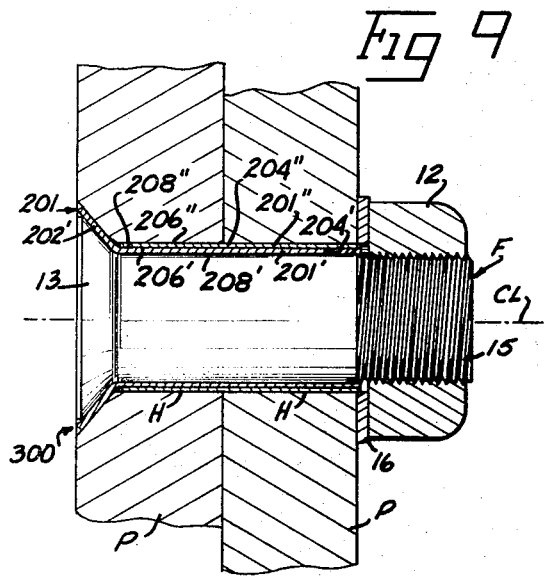
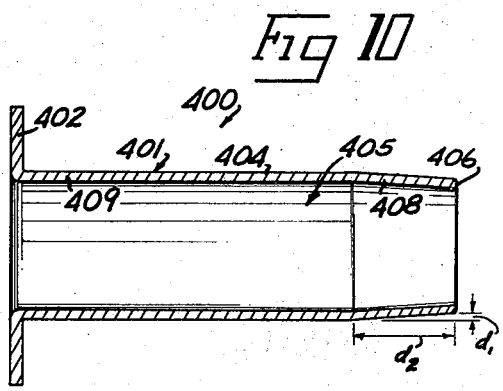
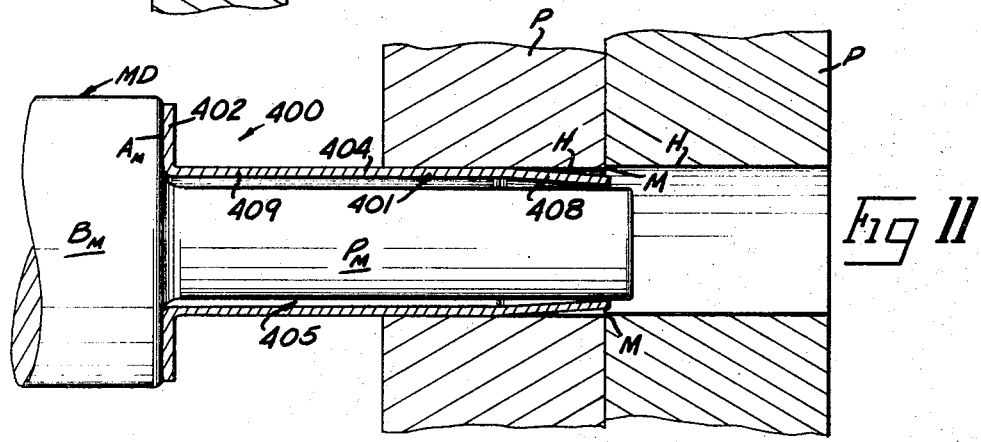
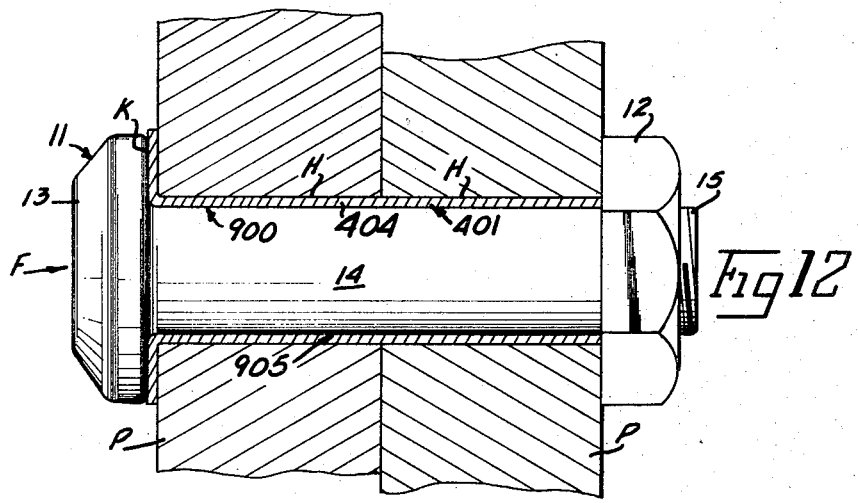

METHOD OF FABRICATING A JOINT

CROSS-REFERENCE TO RELATED APPLICATIONS

This application is a continuation-in-part of my copending application Ser. No. 33,281, filed Apr. 30, 1970 and Ser. No. 882,126, filed Dec. 4, 1969, both of which are continuations-in-part of my application Ser. No. 711,368, filed Mar. 7, 1968, now abandoned.

BACKGROUND OF THE INVENTION

1. Field of the Invention

This invention relates generally to a method for enlarging the effective diameter of fasteners and/or for preventing corrosive chemical reactions between work pieces and fasteners attaching the work pieces together, and more particularly to a preformed sleeve which may be placed around the shank of the fastener in bearing contact therewith. The sleeve has an outside diameter to increase the effective diameter of the fastener and to be in bearing contact with the work pieces when the fasteners are in position through aligned holes in the work pieces. The invention is primarily aimed at, though not necessarily limited to, aerospace and marine structures. In such structures shear loading of fasteners is especially prevalent and precise fasteners in close tolerance holes are always used. This invention is meant to solve problems relating to fastener installation especially in aerospace and marine structures.

2. Discussion of the Prior Art.

Generally high strength fasteners for attaching together work pieces having aligned holes therethrough in highly loaded structures come in standard graduated sizes. It has been found in practice, however, that when one of these standard fasteners has been inadvertently and improperly installed in work pieces of a critical, highly loaded structure, it is necessary to remove these fasteners therefrom and replace them. Under present conditions, when the fasteners are to be replaced, the aligned holes through the work pieces must be redrilled to the next larger standard size because of the damage resulting from improperly installed fasteners or from corrosion. This requires the use of a standard fastener which is appreciably larger than the fastener previously installed therein usually 1/32 or 1/16 inch. A special oversize fastener which falls between two standard size fasteners could be used to fasten the work pieces together. Since such oversize fasteners must be made in very small quantities, the cost of production, stocking, and distribution in the work areas where these fasteners are used becomes prohibitive when large numbers of fasteners are being utilized as in the aerospace industry. A means of easily making fasteners oversize on the job is required. This means requiring that the oversizing elements must be made of rigid, relatively hard and strong material which will trasmit bearing loads from the fastener to the work pieces.

It is also necessary that the diameter of the oversizing element be close tolerance in the order of ±.001 inch both in outside and inside diametral tolerances. It is also essential that the fastener with the surrounding enlarging element have an outside diameter such that the enlarged holes which it fits into can be made with standard, readily available drills and reamers. Another feature which is essential is that the oversizing element not require a hole of a size which will significantly reduce the edge distance relationship of the fastener with the sheet edge. Conventional edge distance, as measured from edge of sheet to center of hole is 2 times the fastener or hole diameter. In modification and repair this may be 1½ times. Experience shows that with oversizing of 1/64 inch on basic fastener diameter a repair can be effected without jeopardizing structural integrity. Another consideration is that the material between holes is not significantly reduced. With only a 1/64 inch diametral enlargement the next reduction between holes 1/64 inch or about 0.4 mm. These considerations are all essential to successful fastening of highly loaded structures.

Moreover, it has been found that when the material of the fastener and the work pieces are chemically dissimilar, there generally is a tendency for the fastener to chemically react with the work pieces and cause corrosion to take place therebetween. This becomes especially acute in high corrosive atmospheres, such as naval and tropical uses. When this corrosion takes place between the fasteners and the work pieces, it is necessary to remove the fastener, chemically clean the holes through the work pieces or redrill the holes oversize to remove the corroded metal, and subsequently replace the fastener with the same size fastener or with an oversize fastener. This, too, becomes prohibitively costly when it is required that they be replaced on a large scale.

SUMMARY OF THE INVENTION

These and other problems associated with the prior art fasteners and work pieces are overcome by the invention disclosed herein in that a metal sleeve is provided around the shank of the fastener that extends through the work pieces. The sleeve is in bearing contact both with the fastener and the workppieces so that the load carrying capabilities of the joint, especially in shear, is not reduced. The sleeve may be provided at one end with a flared portion which fits adjacent to and beneath the head of the installed fastener and may be reformable so that the sleeve can be used both with the conventional exposed head fasteners or with the conventional countersunk head fastener. The sleeve may be circumferentially scored so that the length of the sleeve may be appropriately selected and the excess removed for each particular application.

By making the sleeve out of a material that is both strong and chemically inactive with the work pieces, the corrosion that normally attacks the basic structure will then take place between the fastener and the sleeve around the fastener. This provides a condition so that the sleeve member and fastener are attacked as sacrificial anodes. The fastener and sleeve member can be easily removed from the work pieces and replaced without having to further enlarge the holes in the critical basic structure.

Circumferential grooves may be placed in the sleeve at 1/16 inch increments or other increments corresponding to the fastener grip increments in amount and in location. These grooves are about half as deep as the wall thickness of the sleeves or about 0.0035 inch in depth. These grooves are of a "V" type with a sharp bottom. The grooves serve several purposes. One purpose is to hold sealant and/or bonding agent which will bond the sleeve to the wall of the hole and act as a seal to prevent the flow of liquids or gasses through the joint by way of a space between the sleeve and the work pieces. Another purpose is to permit stocking long sleeves and, just prior to installation, break off or cut off the excess sleeve lengths. The break off may be made by use of a special tool or by cutting off with a knife.

These and other features and advantages of the invention will be more clearly understood upon consideration of the following specification and accompanying drawings wherein like characters of reference designate corresponding parts throughout the several views and in which:

BRIEF DESCRIPTION OF THE DRAWINGS

FIG. 4 is a longitudinal cross-sectional view of that embodiment of the invention shown in FIG. 2 as installed;

FIGS. 5–8 illustrate one method of installing the adapter of the invention;

FIG. 9 illustrates the use of multiple sleeve members to enlarge a fastener in a joint.

FIG. 10 discloses another embodiment of the sleeve member of the invention;

FIG. 11 illustrates the method of installing the sleeve member of FIG. 9; and,

FIG. 12 illustrates a fastener joint using the method of FIG. 10.

These figures and the following detailed description disclose specific embodiments of the invention; however, the inventive concept is not limited thereto since it may be embodied in other forms.

DESCRIPTION OF THE ILLUSTRATIVE EMBODIMENTS

All of the different embodiments of fastener adapter disclosed herein serve to enlarge the effective diameter of fasteners to make a composite oversize fastener joint. In addition, when the material of the sleeve member is chemically compatible with the work pieces corrosive chemical reactions between the fastener and the work pieces are prevented.

Figure 1:
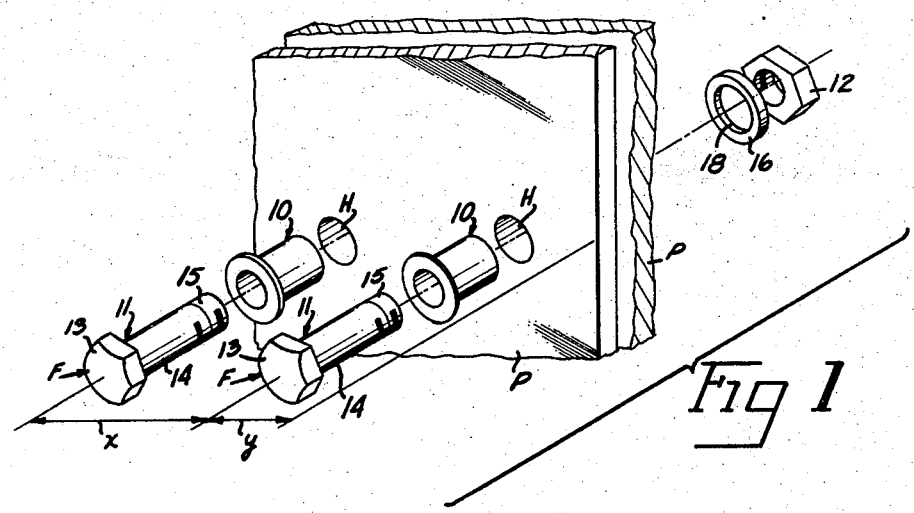
FIG. 1 is an exploded perspective view of the invention with its fastener.

Referring specifically to FIG. 1, the adapter 10 of the invention is to be utilized with a conventional standard fastener F, here shown as a bolt 11 with head 13, shank 14 and threaded end 15; and nut 12 to fasten work pieces P together. The work pieces P have aligned holes H therethrough with a predetermined diameter. The holes H are slightly oversize from these normally made for the shank 14 of fastener F, usually one-half of a standard size difference. For smaller diameter fasteners, the standard size difference is in 1/32 inch increment and for larger diameter fasteners, the standard size difference is in 1/16 inch increments. While the fastener F shown in FIG. 1 is of the exposed head type with a constant diameter shank, it is to be understood that other type fasteners such as that shown in FIG. 6 may be used.

In highly loaded structures such as those of the aerospace and marine industries, the spacing $x$ between adjacent holes H through the work pieces and the free edge distance $y$ is so critical that the use of the next standard larger size fastener F would exceed the safety margin allowed in the basic design. On the other hand, the smaller diameter of the adapters 10 allow them to be used to enlarge the fastener without exceeding this safety margin.

Figure 2:
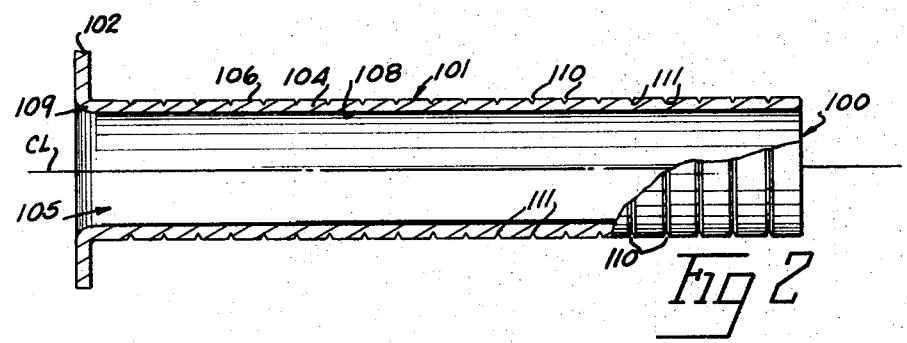
FIG. 2 is a longitudinal cross-sectional view of one embodiment of the invention for use with an exposed head fastener.

Referring more specifically to FIG. 2 a first embodiment of the adapter 10 is shown and designated generally by the numeral 100. This adapter 100 is designed specifically for use with an exposed head, constant diameter shanked fastener. The adapter 100 includes a shank sleeve 101 and an annular head flange 102. The shank sleeve 101 is designed to precisely fit in the holes H between the work pieces P and the shank of the fastener as seen in FIG. 4.

The sleeve 101 includes a tubular side wall 104 defining a fastener receiving central passage 105 therethrough into which the shank 14 is received. The outside surface 106 of side wall 104 is of constant diameter and so is the inside surface 108 thereof with the wall 104 having a thickness of one-half the difference in diameters of shank 14 of the fastener F and the holes H in the work pieces P. As stated hereinabove, this thickness is nominally no greater than 0.008 inch and is usually no more than 5 percent of the fastener diameter. In actual practice, the thickness varies between 0.006 inch to 0.009 inch.

The annular flange 102 is integral with one end of sleeve 101 through bend 109 and extends outwardly around sleeve 101 perpendicular to the centerline CL of passage 105 and sleeve 101. The width of flange 102 is approximately that of the underside bearing surface K of head 13 and the thickness thereof is approximately that of side wall 104. The radius of bend 109 is such that it will fit within the fillet 18a between the head 13 and shank 14 as seen in FIG. 4.

The original length of sleeve 101 is usually formed greater than the grip length of the shank 14 of bolt 11. The sleeve 101 may be adjusted to a length corresponding to the grip length of shank 14 of bolt 11 so that the grip length of adapter 100 is very nearly the same as bolt 11 for use as seen in FIG. 4. For assisting in adjusting the length of sleeve 101, a plurality of circumferentially extending, axially spaced, V-shaped grooves 110 are provided around the side wall 104. The grooves 110 are axially spaced along the wall 104 in increments and location corresponding to the standard grip increments and location of the fasteners F. Each sharp bottom 111 of the grooves 110 lies in a plane perpendicular to centerline CL to insure a close correspondence between fastener grip length and sleeve grip length when the sleeve 101 is severed along one of these grooves. The sharpness of the bottoms 111 of grooves 110 is also critical. Unless the bottom 111 comes to a substantial line point with an extremely small radius, attempts to sever the sleeve 101 by applying radial and longitudinal opposed separation forces across the groove 110 will result in the sleeve 101 splitting or breaking so as not to produce a smooth working edge along the break at the groove. This is especially critical for higher strength materials such as stainless steel and for larger diameter sleeves such as 3/8 inch. The depth of the grooves 110 is sufficient to insure easy severing of the sleeve 101 yet enough material remains in wall 104 between the bottom 111 and inside surface 108 to prevent further separation of sleeve 101 after installation. The depth of grooves 110 is usually one-half the thickness of wall 104 or 0.0035 inch for an adapter having a wall thickness of 1/128 inch for sleeve 101.

By stocking adapters 100 having sleeve lengths greater than the individual fastener grip lengths, fewer different adapters need be stocked since the excess sleeve 101 may be broken or cut off just prior to installation to adjust the sleeve grip length to that of the fastener to be used as seen in FIG. 4. This adjustment may be made using a special tool or knife. The sleeve 101 may be left ungrooved and later cut to length by a special tool to adjust the grip length thereof as disclosed in my co-pending application Ser. No. 882,126.

The grooves 110 also serve as reservoirs to trap and hold a coating of sealant or bonding agent when installed. This will prevent the flow of liquids or gasses through the fastener-adapter joint as well as bond the adapter 100 to the work pieces P. Because the grooves 110 are located in the wall 104 of sleeve 101, the original strength of the fastener F and work pieces P are maintained. If the shank 14 of fastener F were grooved to hold the sealant or bonding agent, then the tensile strength of the fastener F would be reduced sufficiently to cause the fastener to fail as the nut 12 is tightened to form the joint. Moreover, grooving the inside of the holes H through the work pieces P would not only reduce the strength of the work pieces, but also be prohibitively expensive from a production standpoint. The sleeve member 101, on the other hand, does not fail even though it is grooved because the member 101 does not carry any tension or compression load, but only shear loads. Additional grooves 110 may be provided on the inside of side wall 104 to provide internal reserviors to entrap sealant or a bonding agent therein.

The material of the adapter 100 is similar in strength to the work pieces P so that failure of the adapter under load will not occur. In highly stressed joints such as the aircraft industry, the work pieces are generally of metals such as aluminum alloys or stainless steel with a Brinell Hardness Number of at least 60. In such highly stressed joints, the thickness of wall 104 becomes critical since the amount the wall 104 thins out under shear loading of the joint J in which it is used is not a linear relationship with respect to wall thickness. In a test conducted by the inventor, a group of metals were used for a joint such as that used in the aerospace industry and at loads exceeding the design loads recommended for such joints. These tests show that a nominal wall thickness of 1/128 inch or 0.008 inch produces insignificant flow in the side wall 104 of sleeve 101 when the strength of the material of the sleeve 101 has a Brinell Hardness Number of at least 60 and a yield strnegth in excess of 20,000 p.s.i. Making the adapter 100 out of a material which is chemically compatable with the work pieces P will also prevent corrosive reactions with the work pieces P since any reactions due to chemical incompatability will take place between the adapter and fastener. This allows the adapter 100 to be periodically removed and replaced without extensive repair work to the work pieces as was previously required.

The adapter 100 is installed as shown in FIG. 4 by first severing sleeve 101 so that its grip length corresponds to the total length of the holes H in the work pieces and the grip length of the shank 14 of bolt 10. The adapter is then inserted over the fastener and the assembly inserted through the aligned holes in the work pieces or the adapter 100 is first inserted into the holes and then the fastener inserted therethrough. The oversize holes H may be made with standard, readily available drills and seamers since the inside and outside diametral tolerances of the sleeve 101 are maintained in the order of ±.001 inch. Before nut 11 is threaded onto bolt 11, a washer 16 having a passage 18 therethrough to receive the protruding end of sleeve 101 may be placed around the fastener-adapter assembly on that side of the work pieces P opposite head 13 of bolt 11. Then the nut 11 is installed and tightened to finalize the installation. It will also be noted that a layer L of sealant or bonding agent is applied to the outside of the adapter 100 before it is installed. The grooves 110 serve to entrap the sealant and fully coat the inside of the holes.

The nut 12 may have an annular recess 15a on the back side thereof large enough to receive the protruding end of sleeve 101 and prevent interference between the nut 12 and sleeve 101 as the nut is tightened. The washer 16 is made of a material which is chemically compatible with work pieces P to insure that corrosive chemical reactions can only take place between the washer 16 and nut 12. While an exposed head, constant diameter shanked bolt has been illustrated with the adapter 100, it is to be understood that any exposed head, constant diameter shanked fastener may be used therewith.

Also, since both sides of flange 102 and sleeve 101 are supported upon installation, substantially no deformation thereof takes place, especially in the sleeve 101 which must take the shear load in the structure. The joint formed by the fastener-adapter assembly is as great in strength as a similar joint using only a fastener.

Figure 3:
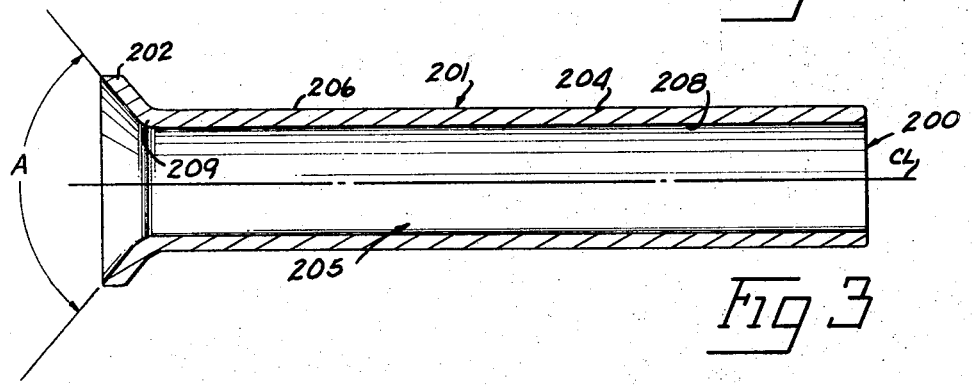
FIG. 3 is a longitudinal cross-sectional view of another embodiment of the invention for use with a countersunk head fastener.

A second embodiment of the adapter 10 is shown in FIG. 3 and designated generally 200. The adapter 200 is designed for use with a standard countersunk head, constant diameter shanked fastener similarly to than described for adapter 100 with an exposed head. The adapter 200 includes a shank sleeve 201 and head flange 202. Sleeve 201 is similar to sleeve 101 with a side wall 204 defining passage 205 about centerline CL along with an inside urface 208 and outside surface 206. Sleeve 201 is dimensioned similarly to sleeve 101 for a precision fit between the fastener and work pieces. While sleeve 201 is shown ungrooved, it may also be grooved as sleeve 101 serve as sealant reserviors and to assist in length adjustment for the appropriate grip length in use.

The annular flange 202 is intergral with one end of sleeve 201 through bend 209 and concentric about passage 205. The flange 202 defines an included angle A equal to that of the fastener to be used therewith. For standard countersunk fasteners in the aircraft industry this included angle is 100°. The width of flange 202 is sufficient for its exposed edge to be approximately flush with the outside surface of the work piece when installed, and the thickness thereof is approximately that of wall 204 of sleeve 201.

The adapter 200 is installed in a manner similarly to that already described for adapter 100. By making the adapter 200 out of a meterial chemically compatable with the work pieces, corrosion of the work pieces can be prevented.

Referring to FIGS. 5 and 6, it will be seen that the adapter 100 can be installed in work pieces by first severing the sleeve 101 to length and then severing the thusly formed tubing again to form sections 101′ and 101″ where section 101′ is substantially equal in length to the thickness of one of the work pieces and section 101″ is substantially equal in length to the thickness of the other work piece. When the segmented adapter 100 is placed in the work pieces, usually with a bonding agent to hold the adapter sections in place, the fastener F may be placed therethrough and locked in place by the nut 12 in conventional manner to form joint J′. When the fastener F is removed, the work pieces may be separated while the adapter sections 101′ and 101″ are retained in the work pieces.

Likewise, FIGS. 7 and 8 illustrate the use of the adapter 100 to make and adapter without a head flange to enlarge the diameter of a fastener in the same manner as illustrated in FIGS. 5 and 6.

Referring to FIG. 9, a double oversize adapter 300 is illustrated in a joint J″ similar to the joint shown in FIG. 4. The adapter 300 uses a pair of sleeves 201 which nest within each other to produce a combined enlargement of fastener diameter equal to twice the thickness of side wall 204 of each sleeve 201. The inside diameter $d_i'$ of the inside surface 208′ of the inner sleeve 201′ is substantially equal to the shank diameter of fastener F. The thickness of wall 204′ of inner sleeve 201′ is the same as that disclosed hereinabove for all of the adapters or nominally substantially 0.008 inch. The inside diameter $d_i''$ of the inside surface 208″ of the outside sleeve 201″ is equal to the outside diameter of the outer surface 206′ of inner sleeve 201′. The thickness of side wall 204″ of outer sleeve 201′ is also the same as that disclosed. Thus, it will be seen that after the sleeves 201′ and 201″ are cut to the proper length, the inner sleeve 201′ can be placed around the shank 14 of fastener F and then the fastener F with sleeve 201′ there around forced into the sleeve 201″ to form the double oversize. Because the inner surface 208″ and outer surface 206′ interrupt the total combined wall thickness and provide an additional frictional surface at the interface between surfaces 206′ and 208″ movement of the material of the sleeves 201′ and 201″ axially within the holes H of work pieces P is prevented. Also, the holes H have a diameter substantially equal to that of the outside surface 206″ of the outer sleeve 201″.

Referring to FIGS. 10–12, another embodiment of the adapter is shown and designated by the numeral 400. Adapter 400 includes a shank sleeve 401 and an annular head flange 402 at one end of sleeve 401. The sleeve 401 includes a tubular side wall 404 defining a fastener receiving central passage 405 therethrough and integral with head flange 402 at one end thereof. The free end 406 of the sleeve 401 tapers inwardly a prescribed amount $d_1$. The tapered portion 408 of side wall 404 extends down sleeve 401 a prescribed distance $d_2$. Thus, the side wall 404 has a constant diameter section 409 adjacent head flange 402 with the tapering diameter in portion 408 at the distal end. The thickness of side wall 404 is substantially constant along its length and is within the same thickness range as specified for adapters 100–300.

The tapered portion 408 serves to center the adapter 400 as it is inserted into holes H in the work pieces P as seen in FIG. 11 and to align any small amounts of misalignment M of work pieces P within holes H. A mandrel MD is provided for inserting the adapter 400 into the holes H as seen in FIG. 11. The mandrel MD includes a base $B_m$ with a cylindrical pilot $P_m$ projecting from one end of base $B_m$ so that an annular abuttment $A_m$ is provided on base $B_m$. The diameter of pilot $P_m$ is such that it will be just freely received through the tapered portion 408 and has a length such that the extending end of pilot $P_m$ extends at least just part the tapered portion 408 when the head flange 402 is resting on abuttment $A_m$. Thus, the abuttment $A_m$ actually forces adapter 400 into holes H until the head flange 402 of the adapter rests against the near side of the work pieces P while the pilot $P_m$ simply guides the sleeve 401 into the holes H. It will be noted that the side wall 404 is ungrooved and that the length of sleeve 401 has been preformed to a length substantially equal to the total thickness of work pieces P and the grip length of fastener F to be installed in holes H as seen in FIG. 12.

The sleeve 401 may be made of a metal as set forth hereinabove for the other adapters, however, when the adapter 400 is to be used in an interference fit with the work pieces P, the metal should be as strong as stainless steel in order that the sleeve 401 not collapse during the insertion of adapter 400 into holes H with mandrel MD especially when interference is obtained. As the adapter 400 is inserted in interference, the sleeve 401 is compressed slightly so that its inside and outside diameters are slightly reduced. This serves to cold work the inside of holes H to enhance the fatigue strength of the joint.

When the fastener F is inserted into the adapter 400 and forced toward the position shown in FIG. 12, the shank of the fastener expands both the sleeve and hold diameter. As the shank of the fastener passes through the tapered portion 408, it is expanded so that the sleeve 401 is not cylindrical for its entire length with a constant diameter. The nut 12 is then screwed in place on the fastener to complete the joint.

The dimensions of sleeves 104, 204, 304 and 404 are maintained within the required close tolerance in the order of ±0.001 inch. This insures the precision fit necessary between the work pieces P, fasteners F and adapters 10.

From the foregoing, then, it will be seen that the method of invention serves to precisely enlarge by a limited, fixed close tolerance amount, the effective shank diameter of a fastener to a standard dimension to permit the structural joining of work pieces for highly loaded applications. This method comprises encircling that portion of the fastener in bearing contact with the work pieces with an enlarging member of predetermined close tolerance and limited thickness; and inserting the fastener with the enlarging member therearound through the aligned holes in the work pieces and tightening the fastener in conventional manner. If the material of the enlarging member is chemically inert with respect to the work pieces, then there will be no chemical corrosive reaction between the member and work pieces.

Although various thicknesses for the wall 104, 204, 304 and 404 may be used, it is desirable to have these thicknesses substantially 0.008 inch which gives an overall increses in effective diameter to the fastener F of 1/64 inch. It is also understood that the adapters may be coated with an anticorrosive material to prevent corrosive chemical reactions between the various sleeve and the work pieces P.

When one of the adapters is utilized in repair, the old fastener is removed from the aligned holes H in the work pieces P, and the aligned holes H enlarged by a specified amount, usually 1/64 inch. The adapter is then placed around the appropriate fastener F and the assembly inserted through the enlarged holes H and tightened into place. When one of the adapters is used in original construction, the initial steps of removing the fastener F and enlarging the holes H set forth hereinabove can be eliminated.

When a person installing a large number of the same size fasteners F and damages only a few holes H in the work pieces P, only the damaged holes H must be made oversize. It is therefore disirable that all of the holes H be the same size to facilitate the installation of the fastener F. This can be accomplished by installing the adapter in the damaged holes H without the fastener F therethrough and with a bonding agent between the sleeve thereof and the work pieces P. The grooves around the sleeves serve as reservoirs to retain a sufficient amount of the bonding agent therein to insure an adequate bond between the adapter and work pieces P without reducing the strength of the joint. The fasteners F can then be installed in conventional manner just as if all of the holes H were the same size.

While specific embodiments of the invention have been disclosed herein, it is to be understood that numerous adaptations, modifications, and substitutions may be utilized without departing from the scope of the invention.

I claim:

1. A method of fabricating a fasterner joint comprising the steps of:

severing a first thin walled tubular member to a length corresponding to the combined thickness of the work pieces of the joint;

inserting a fastener to be used in the joint through the thusly severed first tubular member;

severing a second tubular member having a nominal inside diameter substantially equal to the nominal outside diameter of the first tubular member to a length corresponding to that of the first tubular member in bearing contact with the shank of the fastener;

inserting the fastener with the first tubular member thereon through the thusly severed second tubular member so that the tubular members nest within each other; and, inserting the fastener with the tubular members thereon through the aligned holes in the work pieces to form the joint.

2. A method of joining together a plurality of juxtaposed work pieces having aligned holes therethrough including the steps:

a. breaking a sleeve member having a tubular side wall externally circumferentially grooved at longitudinally spaced positions where the grooves lie in a plane normal to the centerline of the side wall at one of the grooves so that the length of the sleeve member corresponds to the total thickness of the work pieces;

b. inserting the sleeve member onto the bearing portion of the shank of a fastener; and, c. inserting the fastener with the sleeve member therearound through the aligned holes in the work pieces and tightening the fastener in conventional manner.

3. The method of claim 2 further including the step of coating the externally grooved surface of the side wall of the sleeve member with a sealant prior to step c) so that the grooves will act as reservoirs to entrap the sealant therein during insertion of the sleeve into the holes to increase the sealing between the work pieces and sleeve member.

4. The method of claim 2 further including the step of further breaking the sleeve member at additional grooves so that sub-lengths of the sleeve member are formed after step a) and before step b) that correspond to the individual thicknesses of the work pieces; and wherein step b) includes inserting the sub-lengths onto the fastener so that each sub-length will lie within its corresponding work piece.

5. The method of claim 2 wherein the sleeve member is made of a material that is not reactive with the work pieces.

6. A method of joining together a plurality of juxtaposed work pieces having aligned holes therethrough including the steps:

a. breaking a sleeve member having a tubular side wall externally circumferentially grooved at longitudinally spaced positions where the grooves lie in a plane normal to the centerline of the side wall at one of the grooves so that the length of the sleeve member corresponds to the total thickness of the work pieces;

b. inserting the sleeve member through the aligned holes in the work pieces; and, c. inserting a fastener through the sleeve member so that the bearing portion of the shank of the fastener is within the sleeve member and tightening the fastener in conventional manner.

7. The method of claim 6 further including the step of coating the externally grooved surface of the side wall of the sleeve member with a sealant prior to step b) so that the grooves will act as reservoirs to entrap the sealant therein during insertion of the sleeve into the holes to increase the sealing between the work pieces and sleeve member.

8. The method of claim 6 further including the step of further breaking the sleeve member at additional grooves so that sub-lengths of the sleeve member are formed after step a) and before step b) that correspond to the individual thicknesses of the work pieces; and wherein step b) includes inserting the sub-lengths into the holes through the work pieces so that each sub-length will lie within its corresponding work piece.

9. The method of claim 6 wherein the sleeve member is made of a material that is not reactive with the work pieces.

* * * * *